United States Patent
Tresness

(10) Patent No.: US 12,556,293 B2
(45) Date of Patent: Feb. 17, 2026

(54) CONCURRENT UPSTREAM AND DOWNSTREAM LEAKAGE DETECTION

(71) Applicant: Greg Tresness, Manlius, NY (US)

(72) Inventor: Greg Tresness, Manlius, NY (US)

(73) Assignee: Arcom Digital, LLC, Syracuse, NY (US)

( * ) Notice: Subject to any disclaimer, the term of this patent is extended or adjusted under 35 U.S.C. 154(b) by 512 days.

(21) Appl. No.: 17/820,603

(22) Filed: Aug. 18, 2022

(65) Prior Publication Data

US 2023/0063484 A1    Mar. 2, 2023

Related U.S. Application Data

(60) Provisional application No. 63/260,851, filed on Sep. 2, 2021.

(51) Int. Cl.
| | |
|---|---|
| H04B 17/17 | (2015.01) |
| H04B 10/2575 | (2013.01) |
| H04B 17/19 | (2015.01) |
| H04B 17/354 | (2015.01) |

(52) U.S. Cl.
CPC ........... *H04B 17/354* (2015.01); *H04B 17/17* (2015.01); *H04B 17/19* (2015.01); *H04B 10/2575* (2013.01)

(58) Field of Classification Search
None
See application file for complete search history.

(56) References Cited

U.S. PATENT DOCUMENTS

| | | | | |
|---|---|---|---|---|
| 6,600,515 | B2 * | 7/2003 | Bowyer | H04N 7/087 348/192 |
| 8,856,850 | B2 * | 10/2014 | Sala | H04N 17/00 348/192 |
| 8,904,460 | B2 * | 12/2014 | Zinevich | G01S 5/06 725/111 |
| 9,565,580 | B2 * | 2/2017 | Zinevich | H04N 21/4382 |
| 9,832,089 | B2 * | 11/2017 | Zinevich | H04N 17/004 |
| 9,882,663 | B2 * | 1/2018 | Zinevich | G01S 5/021 |
| 9,882,668 | B2 * | 1/2018 | Zinevich | H04B 3/542 |
| 10,630,401 | B2 * | 4/2020 | Zhang | H04B 3/487 |
| 11,140,016 | B1 * | 10/2021 | Hoffman | H04L 27/2657 |
| 11,356,178 | B2 | 6/2022 | Zinevich | |
| 12,028,123 | B2 * | 7/2024 | Zinevich | H04B 17/102 |
| 2006/0248565 | A1 * | 11/2006 | Shimp | H04N 7/106 725/62 |

(Continued)

OTHER PUBLICATIONS

Chrostowski, John, et al., "Detecting and Measuring Upstream Leakage Levels in a One Gpbs Symmetrical High Split Hybrid Fiber Coax Network," 2020, Fall Technical Forum (38 pages).

*Primary Examiner* — Jai M Lee
(74) *Attorney, Agent, or Firm* — Harris Beach Murtha Cullina PLLC

(57) ABSTRACT

A method for leakage detection in an aeronautical band for a high split HFC network includes: providing a vehicle borne leak detector configured to perform substantially simultaneous upstream and downstream leakage detection; and while traversing a hub containing any quantity of high split nodes, performing a substantially simultaneous upstream leakage detection and a downstream leakage detection at about a same frequency. A system for leakage detection in an aeronautical band for a high split HFC network is also described.

16 Claims, 6 Drawing Sheets

(56) References Cited

U.S. PATENT DOCUMENTS

| | | | |
|---|---|---|---|
| 2013/0291044 A1* | 10/2013 | Zinevich | H04N 21/44209 |
| | | | 725/111 |
| 2014/0105251 A1* | 4/2014 | Bouchard | H04B 1/707 |
| | | | 375/141 |
| 2015/0341810 A1* | 11/2015 | Murphy | G01R 31/58 |
| | | | 375/224 |
| 2016/0036492 A1* | 2/2016 | Williams | G01S 5/02695 |
| | | | 375/228 |
| 2021/0135755 A1* | 5/2021 | Zinevich | H04B 10/612 |
| 2022/0200715 A1 | 6/2022 | Zinevich | |

* cited by examiner

CONCURRENT UPSTREAM AND DOWNSTREAM LEAKAGE DETECTION

CROSS-REFERENCE TO RELATED APPLICATIONS

This application claims priority to and the benefit of co-pending U.S. provisional patent application Ser. No. 63/260,851, CONCURRENT UPSTREAM AND DOWNSTREAM LEAKAGE DETECTION, filed Sep. 2, 2021, which application is incorporated herein by reference in its entirety.

FIELD OF THE APPLICATION

The application relates to leakage detection in a high split HFC network.

BACKGROUND

High split HFC networks are starting to move from test to actual live deployment. In the United States, leakage detection in the aeronautical band is mandated by the FCC.

SUMMARY

A solution to the problem of leakage detection in the aeronautical band for a high split HFC network configures a vehicle borne leak detector such that while driving in a hub containing any quantity of high split nodes, both upstream and downstream leakage detection is performed substantially simultaneously and in parallel at the same or nearly the same frequency.

A method for leakage detection in an aeronautical band for a high split HFC network includes: providing a vehicle borne leak detector configured to perform substantially simultaneous upstream and downstream leakage detection; and while traversing a hub containing any quantity of high split nodes, performing a substantially simultaneous upstream leakage detection and a downstream leakage detection at about a same frequency.

An upstream OUDP burst can be detected indicating a leak in an absence of a substantially simultaneous downstream leak. A downstream leak can be detected indicating a leak in an absence of a substantially simultaneous upstream leak.

The step of providing can include providing the vehicle borne leak detector including a downstream leak detector and an upstream leak detector.

The step of providing can include providing the vehicle borne leak detector including a GPS location system.

The step of performing can further include receiving information on the hub and split high split nodes from a server based on a current GPS location.

The step of providing can include providing an additional DS OFDM detection of an FDX signal. The step of performing a substantially simultaneous upstream leakage detection and a downstream leakage detection at about a same frequency can include an upstream OUDP detection, a DS OFDM detection of the FDX signal, and a DS detection in low or mid split nodes.

A system for leakage detection in an aeronautical band for a high split HFC network includes a vehicle borne leak detector configured to perform substantially simultaneous upstream and downstream leakage detection, and a substantially simultaneous upstream and downstream leakage detection process. While traversing a hub containing any quantity of high split nodes, a substantially simultaneous upstream and a downstream leakage detection is performed at about a same frequency.

The vehicle borne leak detector can include a downstream leak detector and an upstream leak detector.

The vehicle borne leak detector can include a GPS location system.

The vehicle borne leak detector can include a computer operatively coupled to a server and wherein the computer receives information on the hub and split high split nodes from the server based on a current GPS location.

The vehicle borne leak detector can be configured to perform an upstream OUDP detection, a DS OFDM detection of an FDX signal, and a DS detection in low or mid split nodes. While traversing a hub containing any quantity of high split or FDX nodes, a substantially simultaneous upstream OUDP detection, DS OFDM detection of an FDX signal, and DS detection in low or mid split nodes can be performed.

The foregoing and other aspects, features, and advantages of the application will become more apparent from the following description and from the claims.

BRIEF DESCRIPTION OF THE DRAWINGS

The features of the application can be better understood with reference to the drawings described below, and the claims. The drawings are not necessarily to scale, emphasis instead generally being placed upon illustrating the principles described herein. In the drawings, like numerals are used to indicate like parts throughout the various views.

DETAILED DESCRIPTION

Figure 1:
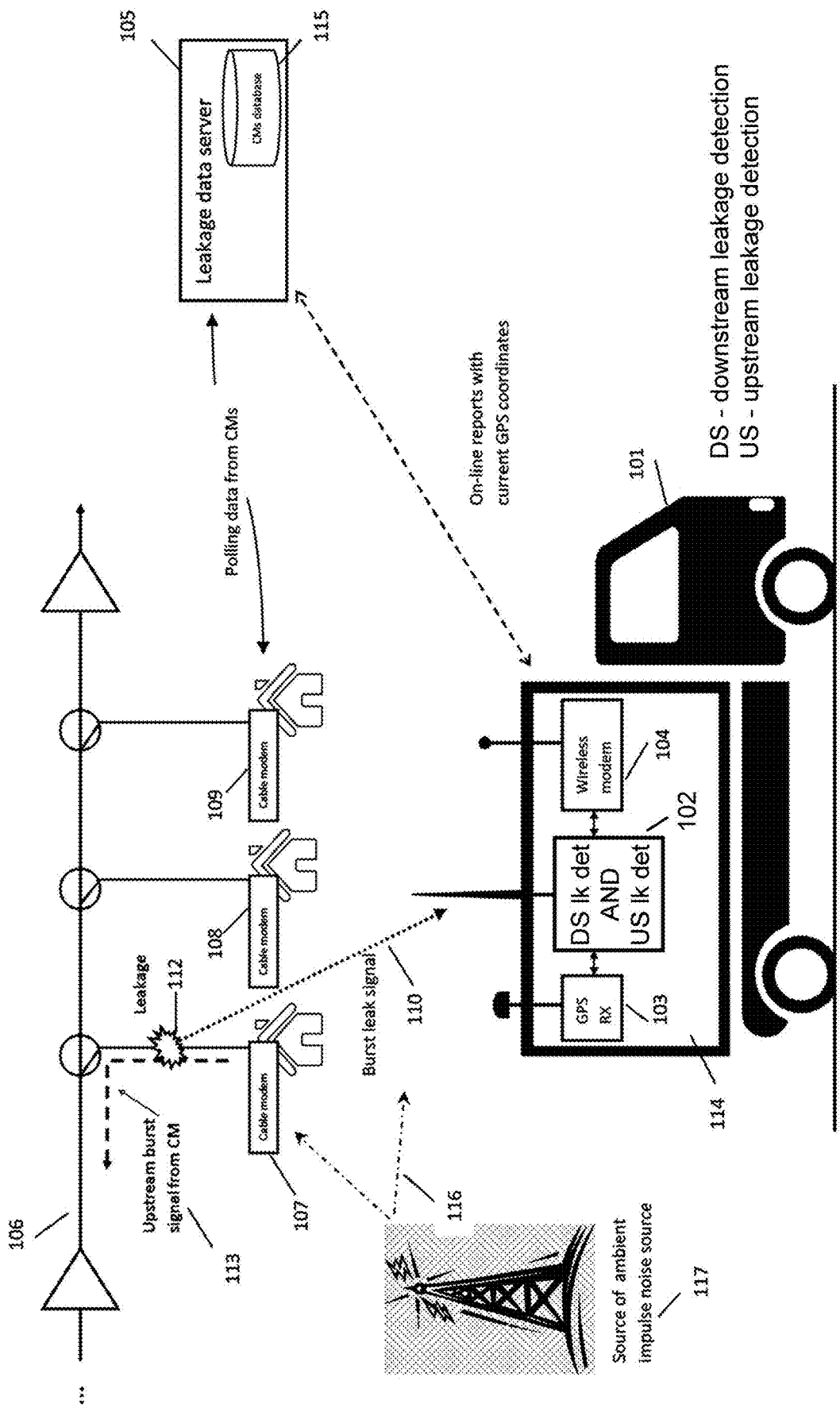
FIG. 1 is a block diagram of the system for a substantially simultaneous detection of leakage in both a downstream and in an upstream bandwidth of HFC network.

FIG. 1 shows an exemplary system for the leakage detection in the aeronautical band for a high split HFC. In the new system and method according to the application, leakage detector 102 simultaneously monitors downstream (DS) leakage and upstream (US) leakage and sends reports to leakage data server 105 with results of detection and the current GPS coordinates of truck 101. Leakage data server 105 selects in database 115, CMs 107, 108 and 109, which are located in the zone of truck 101. When the truck 101 moves to other locations, the server 105 will select a corresponding hub and nodes. This process can continue uninterrupted during a leakage patrol.

High split HFC networks are starting to move from test to actual live deployment. The necessity to do aeronautical band leakage detection has been discussed thoroughly in the published SCTE 2020 paper 'Leakage in a high split world', Chrostowski, Rice, Tresness, and Lewandowski; and has also been described in U.S. patent application Ser. No.

17/654,284, MONITORING LEAKAGE IN AERONAUTICAL BAND OF HIGH SPLIT HFC, filed Nov. 4, 2020, and U.S. Pat. No. 11,356,178, MONITORING LEAKAGE IN AERONAUTICAL BAND OF HIGH SPLIT HFC both assigned to Arcom Digital. All of the above applications and the SCTE paper are incorporated herein by reference in their entirety for all purposes.

As the newly upgraded high split nodes come on-line adjacent to traditional low split nodes and adjacent to mid split nodes to date, there has been limited implementation of corresponding leakage detection systems and methods for these newly upgraded high split nodes.

Figure 2:
FIG. 2 is a drawing showing a map with an outline of several exemplary hubs in an HFC network.

FIG. 2 is a drawing showing a map with an outline of several hubs in an HFC network. The outer boundary lines indicate the hub boundaries 201, where the RF signals originate within the boundary either from the headend, or in the case of R-PHY or R-MACPHY nodes, originate at the node. Node boundaries 203 in FIG. 1 are indicated by the smaller boundary lines within the larger encircled hub boundaries 201. There are numerous nodes within any one hub.

It is typical for different hubs to have different system bandwidths and to have different channel lineups. It is also common for leakage detection to be performed simultaneously in different frequency bands monitored by the network operator. For example in the aeronautical band, a middle frequency band, and the LTE band can be monitored by the network operator.

For a variety of reasons, several leakage detection schemas are currently used at different leakage detection bands. As such, for current downstream (DS) leakage detection systems such as with the Arcom Digital QAM Snare™ system, automated switching schemas are used. When the field detector installed in a GPS equipped vehicle crosses a hub boundary, a new detector configuration is pushed to the detector from a leakage application server.

High split present new challenges. The decision as to which nodes will be upgraded to high split is a business decision that will be made over time by operators. It is expected that high split nodes will be added adjacent to current low and mid split nodes in a seemingly random manner. The high split nodes will require upstream (US) leakage detection likely using an OUDP approach. The low and mid split nodes will likely use status quo downstream leakage detection. Therefore, the previously described automatic switching schemas will no longer be at the hub level. Where switching has previously been done when crossing a hub boundary, now switching will likely be done at the much smaller node level. Switching at the node level introduces two significant complications.

A first complication is that nodes will be added quite frequently, likely with multiple nodes added every day. The planned upgrade schedule should be highly organized and planned with a corresponding map update procedure required in the leakage server application. The server should be aware of the high split hub boundaries, so the server can push leakage configurations to a leakage detector in the field. With tens of thousands of nodes that a typical large cable television operator has, there will be a significant and costly effort to setup, plan, coordinate, and maintain the high split node boundaries as they come online.

A second complication is both a technical and a practical one. It can take several seconds, typically on the order of 5-10 seconds to switch from one profile to the other. This delay is due to communication and timing delays in the server receiving GPS data from the detector as to current location, delays in the server calculating that the detector has crossed a boundary and uses an updated detection profile, delays in transmitting and receiving the new detection profile to the detector, and delay in the detector internally reconfiguring its settings. During this switch over period, the vehicle continues to drive. Nodes can be physically small, so it is easy to see, for example, how a 10 second profile switch could result in a significant portion of a node being missed for leakage detection. In the United States, leakage detection in the aeronautical band is mandated by the FCC. A missed section of plant during a leakage detection session, could potentially cause regulatory issues for the cable operator.

As a way to get around the two complications described above, a new and novel approach would be to approach leakage detection differently. It was realized that a leakage detector can be configured such that while driving in a hub containing any quantity of high split nodes, both upstream and downstream leakage detection is performed substantially simultaneously and in parallel at about the same frequency.

Example—If a leakage detection vehicle is within the geographical boundary of a high split node, both upstream and downstream leakage detection is tuned to a 6 MHz bandwidth corresponding to EIA channel 16. Assume the vehicle passes by a physical location where signal leakage is occurring, such as can be caused by a loose connector or poorly shielded cable. Because it is a high split node, the upstream OUDP burst would be detected. However, because no downstream transmission exists on this specific node at channel EIA 16, the downstream detector would not detect any leak. Conversely when the vehicle is within the boundary of a low or mid split node, assuming a vehicle passes by a leak location; the upstream detector would not detect any leak because no upstream signals are present on the node at the EIA channel 16 detection frequency. However, the downstream detector would detect the downstream leaked signals and would indicate and alarm as to the presence of a detected leak.

The new approach according to the Application, can use an addition tuner and detector resources to perform the leakage detection twice. Both the DS leakage detector and the US leakage detector operate substantially simultaneously. The cost and added complexity of substantially simultaneous DS and US leakage detection is worthwhile in solving the two complications described above.

Figure 3:
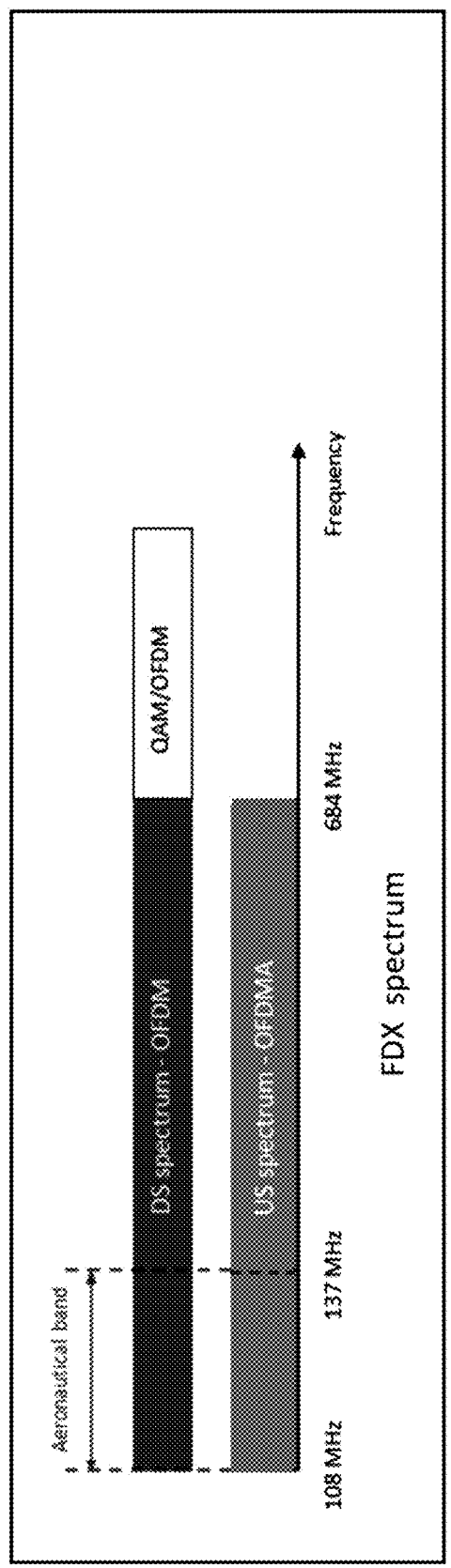
FIG. 3 is a drawing showing an FDX spectrum.

This new approach additionally solves a similar problem that will be present in Full Duplex (FDX) architectures that will be built in the future, and for which standards already exist. FIG. 3 is a drawing showing an FDX spectrum. For FDX, as indicated in the illustration above, simultaneous upstream and downstream transmission of OFDM and OFDMA signals both occur in the 108-137 MHz aeronautical band.

Figure 4:
FIG. 4 is a drawing showing exemplary large differences between upstream and downstream signals at different locations in the HFC network.

FIG. 4 is a drawing showing an example of the large differences in upstream and downstream signal at different locations in the HFC network. In general, in the feeder or trunk line portion of the plant, between multitaps and amplifiers, the downstream signal level will typically be much greater as compared to the upstream level. This situation is reversed in the drop portion of the network between the tap and the subscriber home where the U.S. level is relatively much larger.

Figure 5:
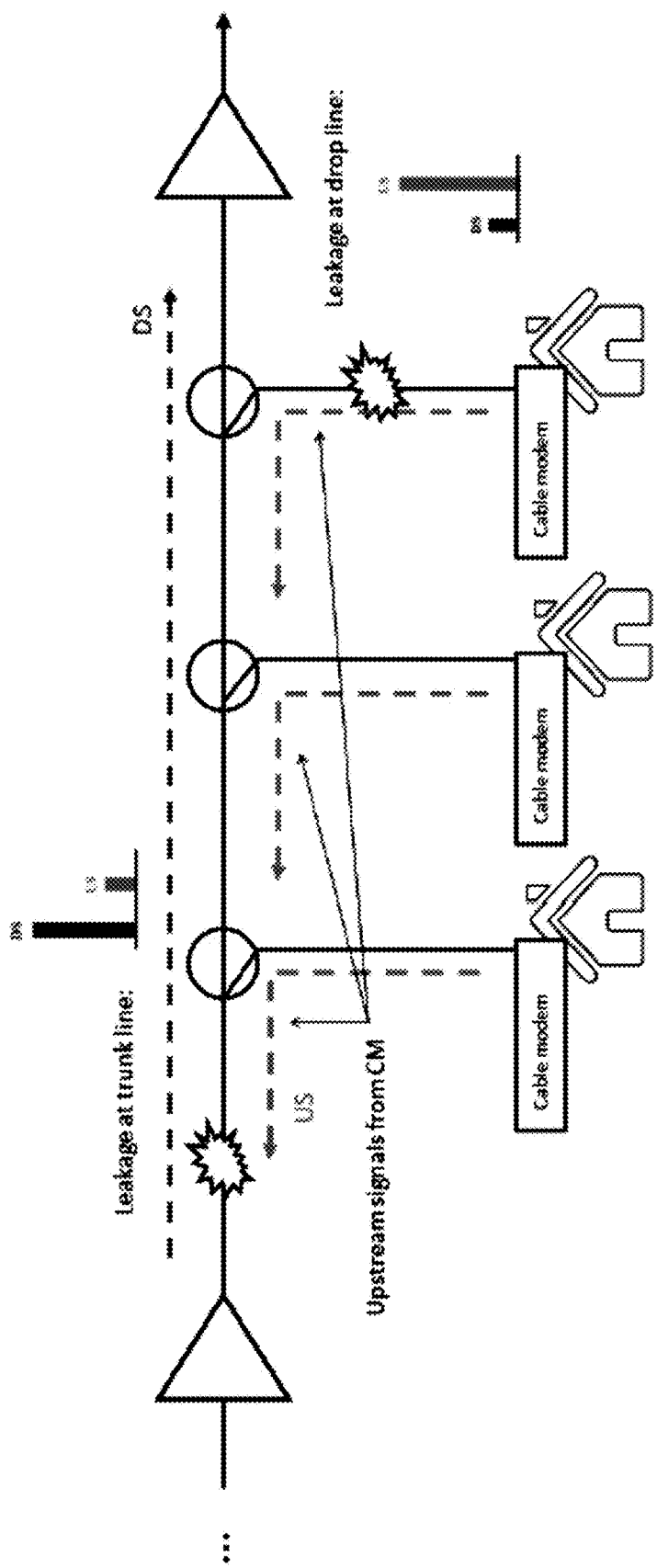
FIG. 5 is a drawing showing two scenarios, the first is a leak location in the trunk line and the second is a leak location in the drop.

FDX Example—FIG. 5 is a drawing showing two scenarios, the first is a leak location in the trunk line and the second is a leak location in the drop. Because with FDX, both transmissions occur at a frequency overlapping the aeronautical band, leakage should be monitored at both the downstream (DS) and upstream (US) bands. If for example detection was only performed in the DS, then in the scenario of a leak occurring in the drop where the DS level is much lower than the US level, the US leak would likely be missed. And the inverse scenario exists also. If leakage detection is only performed in the US band and a leak existed in the trunk line, then the detector would likely miss the DS leak. As such, in order to properly comply with existing FCC signal leakage monitoring rules, a new solution as described hereinabove for a cable operator to maintain compliance, is the simultaneous upstream and downstream detection.

With FDX, the approach of simultaneous US and DS detection within the FDX node can be combined with the approach described herein for the high split HFC network. The DS detection method for FDX which transmits OFDM signals in the DS will be different from status quo DS detection methods of the prior art in low and mid split HFC networks. As such, a different detection profile will be needed for low and mid split nodes and for FDX nodes. To efficiently manage leakage detection in such a scenario, an additional DS leakage detection session should be used. For example, to provide the additional DS leakage detection session, a detector can be configured for simultaneous detection on three concurrent detection sessions at the same or approximately the same frequency in the aeronautical band. One session for the upstream OUDP detection, one for the DS OFDM detection of the FDX signal, and one for the legacy DS detection in the low or mid split nodes.

Figure 6:
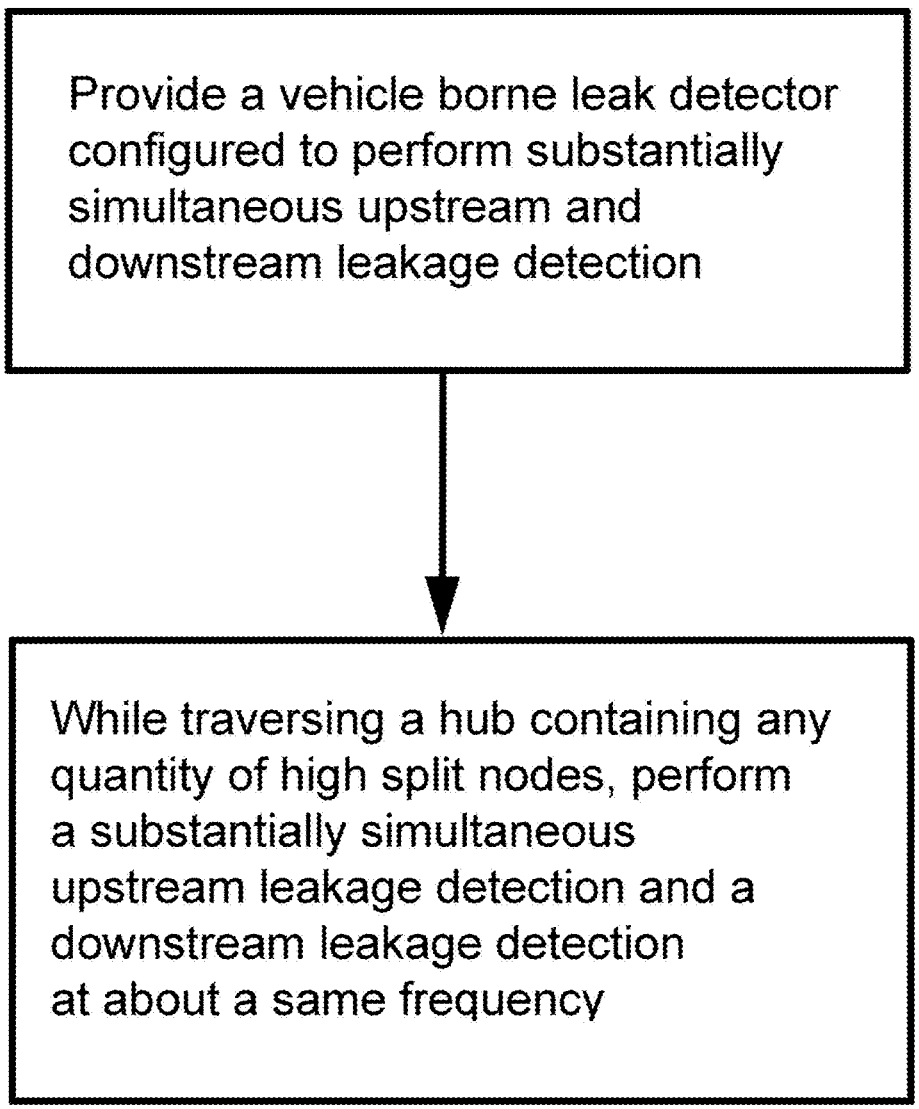
FIG. 6 is a flow chart of a substantially simultaneous detection of leakage in both a downstream and in an upstream bandwidth of HFC network.

FIG. 6 is a flow chart of a substantially simultaneous detection of leakage in both a downstream and in an upstream bandwidth of HFC network.

Software and/or firmware for leakage detection systems described hereinabove can be provided on a computer readable non-transitory storage medium. A computer readable non-transitory storage medium as non-transitory data storage includes any data stored on any suitable media in a non-fleeting manner Such data storage includes any suitable computer readable non-transitory storage medium, including, but not limited to hard drives, non-volatile RAM, SSD devices, CDs, DVDs, etc.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for leakage detection in an aeronautical band for a high split HFC network comprising: providing a vehicle borne leak detector configured to perform substantially simultaneous upstream and downstream leakage detection at a common detection frequency while traversing a hub containing any quantity of high split nodes; while traversing a hub containing any quantity of high split nodes, performing a substantially simultaneous upstream leakage detection and a downstream leakage detection at the common detection frequency; and wherein the vehicle-borne leak detector comprises a first tuner and detector for upstream leakage, and a second tuner and detector for downstream leakage, the first and second tuners being configured to operate simultaneously at the common detection frequency.

2. The method of claim 1, wherein an upstream OUDP burst is detected indicating a leak in an absence of a substantially simultaneous downstream leak.

3. The method of claim 1, wherein a downstream leak is detected indicating a leak in an absence of a substantially simultaneous upstream leak.

4. The method of claim 1, wherein the step of providing comprises providing said vehicle borne leak detector comprising a downstream leak detector and an upstream leak detector.

5. The method of claim 1, wherein the step of providing comprises providing said vehicle borne leak detector comprising a GPS location system.

6. The method of claim 5, wherein the step of performing further comprises receiving information on said hub and said high split nodes from a server based on a current GPS location.

7. The method of claim 1, wherein the step of providing comprises providing an additional DS OFDM detection of an FDX signal.

8. The method of claim 7, wherein the step of performing a substantially simultaneous upstream leakage detection and a downstream leakage detection at the common detection frequency comprises an upstream OUDP detection, a DS OFDM detection of the FDX signal, and a DS detection in low or mid split nodes.

9. The method of claim 1, wherein the common detection frequency is a frequency in the 108-137 MHz aeronautical band.

10. A system for leakage detection in an aeronautical band for a high split HFC network comprising: a vehicle borne leak detector configured to perform substantially simultaneous upstream and downstream leakage detection at a common detection frequency while traversing a hub containing any quantity of high split nodes; a substantially simultaneous upstream and downstream leakage detection process; while traversing a hub containing any quantity of high split nodes, a substantially simultaneous upstream and a downstream leakage detection is performed at the common detection frequency; and wherein the vehicle-borne leak detector comprises a first tuner and detector for upstream leakage, and a second tuner and detector for downstream leakage, the first and second tuners being configured to operate simultaneously at the common detection frequency.

11. The system of claim 10, wherein said vehicle borne leak detector comprises a downstream leak detector and an upstream leak detector.

12. The system of claim 10, wherein said vehicle borne leak detector comprises a GPS location system.

13. The system of claim 10, wherein said vehicle borne leak detector comprises a computer operatively coupled to a server and wherein said computer receives information on said hub and said high split nodes from said server based on a current GPS location.

14. The system of claim 10, wherein said vehicle borne leak detector is configured to perform an upstream OUDP detection, a DS OFDM detection of an FDX signal, and a DS detection in low or mid split nodes.

15. The system of claim 14, wherein while traversing a hub containing any quantity of high split or FDX nodes, a substantially simultaneous upstream OUDP detection, DS OFDM detection of an FDX signal, and DS detection in low or mid split nodes is performed.

16. The system of claim 10, wherein the common detection frequency is a frequency in the 108-137 MHz aeronautical band.

* * * * *